(12) United States Patent
Minei et al.

(10) Patent No.: US 8,467,411 B1
(45) Date of Patent: *Jun. 18, 2013

(54) SERVICE-SPECIFIC FORWARDING IN AN LDP-RSVP HYBRID NETWORK

(75) Inventors: Ina Minei, Sunnyvale, CA (US); Arthi R. Ayyangar, Sunnyvale, CA (US); Nischal Sheth, Los Altos, CA (US); Chaitanya Kodeboyina, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 12/917,294

(22) Filed: Nov. 1, 2010

Related U.S. Application Data

(63) Continuation of application No. 11/642,162, filed on Dec. 20, 2006, now Pat. No. 7,826,482.

(60) Provisional application No. 60/866,328, filed on Nov. 17, 2006.

(51) Int. Cl.
*H04J 3/16* (2006.01)
*H04J 3/22* (2006.01)
*H04L 12/28* (2006.01)

(52) U.S. Cl.
USPC .......... 370/467; 370/466; 370/469; 370/395.5

(58) Field of Classification Search
None
See application file for complete search history.

(56) References Cited

U.S. PATENT DOCUMENTS

| | | | |
|---|---|---|---|
| 6,950,398 B2 | 9/2005 | Guo et al. | |
| 6,973,057 B1* | 12/2005 | Forslow | 370/328 |
| 2004/0095922 A1* | 5/2004 | Sasagawa | 370/351 |
| 2004/0223498 A1 | 11/2004 | Sanderson et al. | |
| 2005/0220148 A1 | 10/2005 | DelRegno et al. | |
| 2006/0072574 A1 | 4/2006 | Akahane et al. | |
| 2006/0083251 A1* | 4/2006 | Kataoka et al. | 370/400 |
| 2006/0182035 A1 | 8/2006 | Vasseur | |
| 2007/0271243 A1 | 11/2007 | Fan et al. | |
| 2009/0141632 A1* | 6/2009 | Lawrence et al. | 370/235 |

OTHER PUBLICATIONS

"Using BGP Community Values to Control Routing Policy in Upstream Provider Network," www.cisco.com/en/US/tech/tk365/technologies_configuration_example09186a0080147562.shtml, Aug. 10, 2005, 10 pp.
U.S. Appl. No. 11/567,570, by Minei et al., filed Dec. 6, 2006.

(Continued)

*Primary Examiner* — Andrew Lai
*Assistant Examiner* — Leon Andrews
(74) *Attorney, Agent, or Firm* — Shumaker & Sieffert, P.A.

(57) ABSTRACT

A router receives a control plane message for constructing a first LSP to a destination within a network that conforms to a first type of LSP. The control plane message includes a label for the first LSP and an identifier that identifies a first type of data traffic. The router receives a second control plane message for constructing a second LSP that conforms to the first type of LSP. The second control plane message includes a label for the second LSP and an identifier that identifies a second type of data traffic. The router installs forwarding state in accordance with policies that associate the first and second types of data traffic with different LSPs of a second type that each traverse different paths through the network, and forwards packets via the interface in accordance with the installed forwarding state.

20 Claims, 7 Drawing Sheets

OTHER PUBLICATIONS

Office Action from U.S. Appl. No. 11/567,570, mailed Mar. 5, 2009, 17 pp.
Response to Office Action mailed Mar. 5, 2009, from U.S. Appl. No. 11/567,570, filed Apr. 15, 2009, 12 pp.
Office Action from U.S. Appl. No. 11/567,570, mailed Jul. 13, 2009, 13 pp.
Response to Office Action mailed Jul. 13, 2009, from U.S. Appl. No. 11/567,570, filed Oct. 13, 2009, 16 pp.
Office Action from U.S. Appl. No. 11/567,570, mailed Feb. 23, 2010, 11 pp.
Response to Office Action mailed Feb. 23, 2010, from U.S. Appl. No. 11/567,570, filed May 24, 2010, 13 pp.
Office Action from U.S. Appl. No. 11/567,570, mailed Aug. 16, 2010, 12 pp.
Response to Office Action mailed Aug. 16, 2010, from U.S. Appl. No. 11/567,570, filed Oct. 12, 2010, 13 pp.
U.S. Appl. No. 11/642,162, by Minei et al., filed Dec. 20, 2006.

* cited by examiner

| POLICIES | |
|---|---|
| 1 | IF FEC IS "1.1.1.1"<br>→ SELECT LSP NAMED "LOW-LATENCY-*" |
| 2 | IF FEC IS "2.2.2.2"<br>→ SELECT LSP NAMED "U.S.-ONLY-*" |
| 3 | IF FEC IS "3.3.3.3"<br>→ SELECT LSP NAMED "GENERAL-*" |
| ⋮ | ⋮ |
| N | . . . |

FIG. 4A

| POLICIES | |
|---|---|
| 1 | IF FEC WITHIN SUBNET "1.0.0.0/8"<br>→ SELECT LSP NAMED "LOW-LATENCY-*" |
| 2 | IF FEC WITHIN SUBNET "2.0.0.0/8"<br>→ SELECT LSP NAMED "U.S.-ONLY-*" |
| 3 | IF FEC WITHIN SUBNET "3.0.0.0/8"<br>→ SELECT LSP NAMED "GENERAL" |
| ⋮ | ⋮ |
| N | . . . |

FIG. 4B

| POLICIES | |
|---|---|
| 1 | IF CARRYING TAG "VOICE"<br>→ SELECT LSP NAMED "LOW-LATENCY-*" |
| 2 | IF CARRYING TAG "U.S.-ONLY"<br>→ SELECT LSP NAMED "U.S.-ONLY-*" |
| 3 | IF CARRYING TAG "GENERAL"<br>→ SELECT LSP NAMED "GENERAL-*" |
| ⋮ | ⋮ |
| N | . . . |

FIG. 4C

| POLICIES | |
|---|---|
| 1 | IF MEMBER OF COMMUNITY "VOICE"<br>→ SELECT LSP NAMED "LOW-LATENCY-*" |
| 2 | IF MEMBER OF COMMUNITY "U.S.-ONLY"<br>→ SELECT LSP NAMED "U.S.-ONLY-*" |
| 3 | IF MEMBER OF COMMUNITY "GENERAL"<br>→ SELECT LSP NAMED "GENERAL-*" |
| ⋮ | ⋮ |
| N | . . . |

FIG. 4D

SERVICE-SPECIFIC FORWARDING IN AN LDP-RSVP HYBRID NETWORK

This application is a continuation of U.S. application Ser. No. 11/642,162, filed Dec. 20, 2006, which claims the benefit of U.S. Provisional Application No. 60/866,328, filed Nov. 17, 2006, the entire contents of each of which are incorporated herein by reference.

TECHNICAL FIELD

The invention relates to computer networks and, more particularly, engineering traffic within a network.

BACKGROUND

Routing devices within a network, often referred to as routers, maintain tables of routing information that describe available routes through the network. Upon receiving an incoming packet, the router examines information within the packet and forwards the packet in accordance with the routing information. In order to maintain an accurate representation of the network, routers exchange routing information in accordance with a defined routing protocol, such as the Border Gateway Protocol (BGP).

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute and establish LSPs within a network. RSVP-TE may use bandwidth availability information accumulated by a link-state interior routing protocol, such as the Intermediate System-Intermediate System (ISIS) protocol or the Open Shortest Path First (OSPF) protocol. An LSP established using LDP may be referred to as an "LDP LSP," and an LSP established using RSVP-TE may be referred to as an "RSVP LSP."

The term "link" is often used to refer to the physical connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links.

SUMMARY

In general, techniques are described for extending a label distribution protocol to allow a core router to dynamically build forwarding information that maps incoming packets to different paths in a network according to a type of data traffic of the packets. Moreover, the techniques provide for traffic engineering so as to allow traffic associated with different Quality of Service (QoS) classes (e.g., voice or data) or traffic having the same QoS class but different requirements (e.g., different security requirements) to easily be directed along specific paths. The label distribution protocol may be the Label Distribution Protocol (LDP) or other label distribution protocol that establishes a path following the Interior Gateway Protocol (IGP).

Often, a multi-service Multiprotocol Label Switching (MPLS) network is established to carry traffic associated with more than one type of service. For example, a single network may be used for carrying both voice and data traffic. Voice traffic and data traffic have different requirements in terms of latency and loss. The core of the network may consist of satellite and land links, and may have a number of traffic-engineered paths that traverse the core. The satellite links in the core of the network may have high latency or loss, and may therefore be unsuitable for voice traffic. An intermediate network may run LDP on the edges of the network and RSVP in the core of the network; such a network may be referred to as an LDP-RSVP hybrid network. In some cases, the network may maintain a full mesh of Resource Reservation Protocol (RSVP) LSPs within the core. The core may be traffic engineered such that some of the RSVP LSPs avoid the satellite links. Traffic arrives at the core routers encapsulated in MPLS packets using labels distributed by LDP (i.e., arrives on LDP LSPs), and cannot be easily identified as belonging to one service or the other. Traffic arriving on LDP LSPs may be tunneled through RSVP LSPs across the core of the network. LDP effectively treats the traffic-engineered RSVP LSPs as single hops along the LDP LSP.

The techniques described herein achieve traffic separation by type of service in the core without relying exclusively on forwarding-plane markings or other information, such as setting indicators within experimental (EXP bits) within the MPLS label of each packet. The techniques described herein allow devices in the network to be configured so that the voice traffic is mapped to RSVP LSPs that avoid the high latency links, data traffic is mapped to LSPs that may have higher latency, and geographically constrained traffic is mapped to an LSP built on links within the geographic constraints.

For example, one solution to the problem of differentiating between types of data traffic that require different treatment in the network core would be to identify the type of data traffic (e.g., voice or data) by setting EXP bits contained in the packets at a customer edge (CE) device. A core router may then select an appropriate core RSVP LSP and install the next hops based on the EXP bits of received packets. However, in some situations, EXP bits cannot be used to determine how the traffic should be treated in the core. This may occur when packets associated with two different types of data traffic requiring different treatment are marked with the same EXP bits, such as in a network where only a small number of EXP markings are used to maintain operational simplicity or due to hardware limitations. Another example in which EXP bits may not appropriately differentiate between types of data traffic is when different types of data traffic are within the same QoS class. For example, two sets of data traffic may have different security requirements. For security reasons, one of the data traffic sets may not be allowed to traverse links that cross a particular geographic boundary, while the other traffic data set has no such limitation. From the point of view of the QoS class of the traffic, the two types of data traffic will have the same behavior and will receive the same EXP markings. However, from the point of view of traffic engineering constraints on the core LSPs, the two types of data traffic will have different characteristics and will require different treatment.

The techniques described herein achieve traffic separation by type of data traffic in the core without relying on EXP bit markings or other forwarding-plane information. In particular, the techniques use control-plane information to select a core RSVP LSP for carrying LDP LSP traffic, even when the LDP LSP traffic has the same QoS class as LDP LSP traffic to be forwarded along a different LSP.

As described herein, a destination router (e.g., an egress provider edge (PE) router on the edge of the network) may advertise label map messages that include a label and an identifier indicating a type of data traffic, such as a unique destination address (e.g., loopback address) of the destination router, for each type of data traffic that requires a path through the network. An administrator or automated software agent configures one or more core routers with policies that associate the types of service with particular LSPs or types of LSPs. As the advertisements are propagated through the network, the core router installs forwarding state in accordance with the policies. When an ingress provider edge (PE) router receives packets, the PE router determines an LDP LSP on which to send the packets based on the destination addresses of the packets, pushes the appropriate LDP label onto the packets, and forwards to the appropriate core router. Where the core router is a transit router of an MPLS LSP (i.e., an intermediate router along the MPLS LSP), the core router receives a packet having an MPLS packet header containing a label, and determines a next hop to which to forward the packet based on the label using the forwarding information. The identifier that indicates the type of traffic is not present when the traffic is being forwarded to the destination, so transit nodes along the path to the network must have forwarding state installed such that traffic associated with different types of data traffic are forwarded to next hops along paths through the network that are appropriate to the particular type of data traffic. The techniques described herein provide a mechanism for installing forwarding state to route different types of data traffic along appropriate paths through the network.

In one embodiment, the egress PE router may be configured to associate a different loopback address with each type of data traffic requiring different treatment in the core of intermediate network, and advertises a label map message for each type of data traffic. The loopback address is used as the label of the FEC carried by the label map message. The configured policies may tell the core routers to select certain types of LSPs based on the FEC or the subnet of the FEC carried by the packet. In another embodiment, the PE routers may apply a tag to the FEC that indicates the type of service of the packet. In this example, the policies are configured on the core routers in terms of the tag values. In yet another example embodiment, where the LSPs across the network are set up using BGP, PE routers may indicate the type of service of the packet using the community value associated with the BGP advertisement. In this case, the policies would be configured on the core routers to associate different types of RSVP LSPs with the different community values.

In one embodiment, a method for forwarding network traffic in a network comprises receiving, with a router, a control plane message for constructing a first LSP to a destination within a network, wherein the first LSP conforms to a first type of LSP, and wherein the control plane message includes a label (L1) for the first LSP and an identifier (I1) that identifies a first type of data traffic. The method further comprises receiving, with the router, a second control plane message for constructing a second LSP within the network to the destination, wherein the second LSP conforms to the first type of LSP, and wherein the second control plane message includes a label (L2) for the second LSP and an identifier (I2) that identifies a second type of data traffic. The method also includes installing forwarding state in accordance with policies that associate the first type of data traffic and the second type of data traffic with different LSPs of a second type that each traverse different paths through the network to associate the labels for the LSPs of the first type with respective LSPs of the second type, and forwarding packets in accordance with the installed forwarding state.

In a further embodiment, a router comprises an interface for receiving a control plane message for constructing a first LSP to a destination within a network, wherein the first LSP conforms to a first type of LSP, and wherein the control plane message includes a label (L1) for the first LSP and an identifier (I1) that identifies a first type of data traffic. The interface also receives a second control plane message for constructing a second LSP within the network to the destination, wherein the second LSP conforms to the first type of LSP, and wherein the second control plane message includes a label (L2) for the second LSP and an identifier (I2) that identifies a second type of data traffic. The router further includes a control unit that installs forwarding state in accordance with policies that associate the first type of data traffic and the second type of data traffic with different LSPs of a second type that each traverse different paths through the network to associate the labels for the LSPs of the first type with respective LSPs of the second type, and forwards packets via the interface in accordance with the installed forwarding state.

In another embodiment, a computer-readable medium comprises instructions for causing a programmable processor to forward network traffic in a network. The instructions cause the programmable processor to receive, with a router, a control plane message for constructing a first LSP to a destination within a network, wherein the first LSP conforms to a first type of LSP, and wherein the control plane message includes a label (L1) for the first LSP and an identifier (I1) that identifies a first type of data traffic. The instructions further cause the processor to receive, with the router, a second control plane message for constructing a second LSP within the network to the destination, wherein the second LSP conforms to the first type of LSP, and wherein the second control plane message includes a label (L2) for the second LSP and an identifier (I2) that identifies a second type of data traffic. The instructions also cause the processor to install forwarding state in accordance with policies that associate the first type of data traffic and the second type of data traffic with different LSPs of a second type that each traverse different paths through the network to associate the labels for the LSPs of the first type with respective LSPs of the second type, and forward packets in accordance with the installed forwarding state.

In yet another embodiment, a system comprises a first router, and a second router coupled to the first router by a plurality of RSVP LSPs, wherein the RSVP LSPs traverse different paths between the first router and the second router within a network. The first router dynamically installs forwarding state in response to a plurality of control plane messages received from the second router, wherein each of the control plane messages includes a different LDP label identifying a different LDP LSP and an identifier identifying a type of traffic. The first router installs the forwarding state by applying policies that associate different types of data traffic with different RSVP LSPs from among the plurality of RSVP LSPs to associate each of the LDP labels with a respective RSVP label identifying an RSVP LSP, receives traffic of different types along the LDP LSP and forwards the traffic of different types along the different paths of the RSVP LSPs to the second router.

The techniques may provide one or more advantages. For example, the techniques provide for service-specific traffic engineering so as to allow different network traffic associated with different types of application services (e.g., voice traffic, data traffic) or traffic having other unique requirements, such as geographically constrained traffic, to easily be directed along specific network paths. Moreover, the techniques provide such features without requiring dual-topologies, i.e., a separate full-mesh topology of LSPs for each type of data traffic. In other words, types of network traffic can locally be directed along particular LSPs without requiring that all of the nodes associated with the LSPs be aware of the different types of traffic being forwarded. In addition, the techniques differentiate between types of traffic without exclusively relying on EXP bits or other forwarding-plane markings that may be used to indicate a Quality-of-Service (QoS).

As another example, in some embodiments the techniques may be applied in a multi-vendor environment in which devices from multiple vendors are deployed. In some embodiments, only the egress device of an RSVP LSP need be configured as described herein, thereby allowing the techniques to easily be deployed in a multi-vendor environment.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 4A-4D are block diagrams illustrating example policy data structures that may be maintained by the core router of FIG. 3.

DETAILED DESCRIPTION

Figure 1:
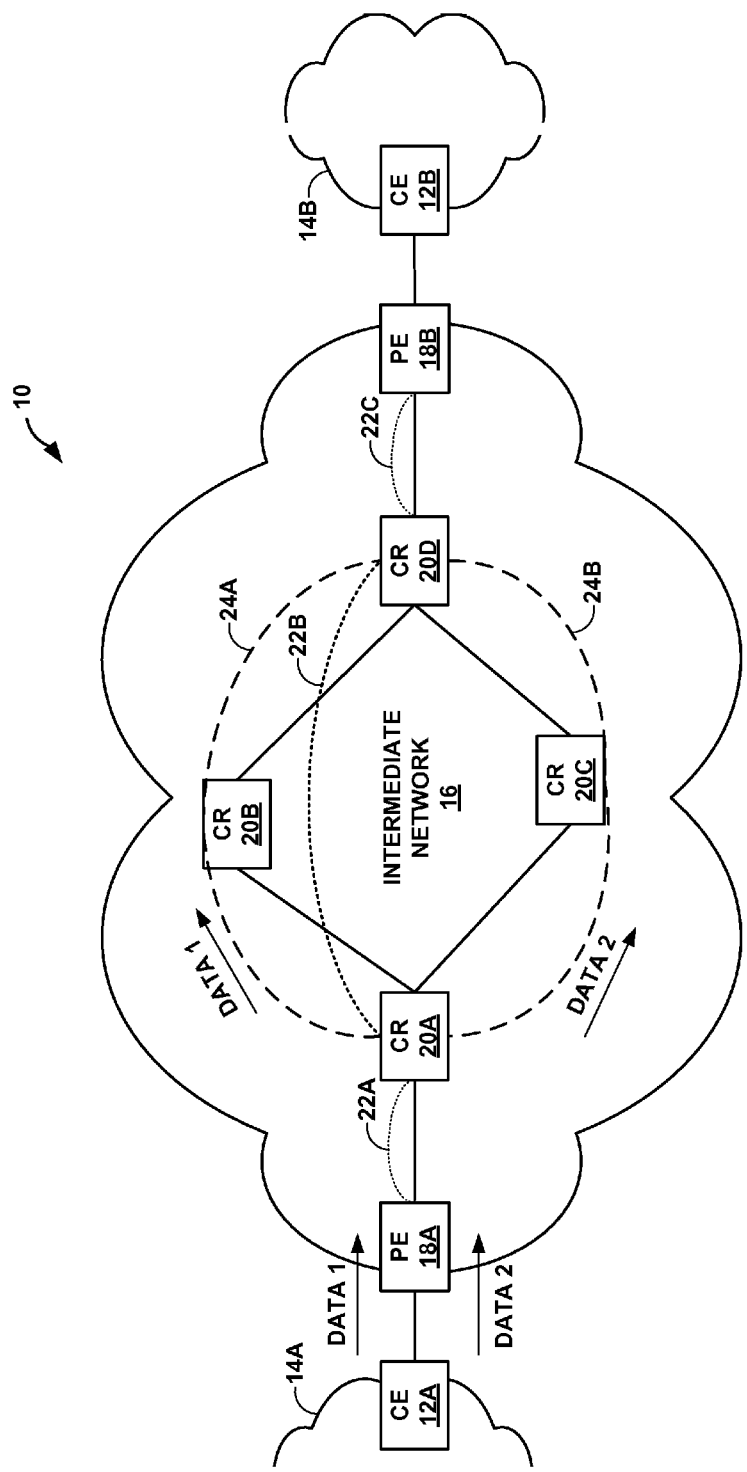
FIG. 1 is a block diagram illustrating an exemplary system having core routers that advertise label map messages and construct forwarding state to transmit traffic associated with different types of data traffic over different paths through a network.

FIG. 1 is a block diagram illustrating an exemplary system 10 having a customer edge (CE) router 12A associated with a first customer network 14A that sends traffic to CE router 12B associated with a second customer network 14B. CE router 12A sends the traffic through an intermediate network 16 that includes a plurality of provider edge (PE) routers 18A-18B ("PE routers 18") deployed on the edges of intermediate network 16, and a plurality of core routers (CR) 20A-20D ("core routers 20") that form the core of intermediate network 16. Intermediate network 16 may be a service provider network or a collection of service provider networks. In the example of FIG. 1, intermediate network 16 is a large network that spans multiple countries, such as the United States and Canada. For example, core router 20C may be located in Canada, while core routers 20A, 20B, and 20D are within the United States.

PE routers 18 and core routers 20 transmit the traffic across intermediate network 16 by encapsulating the traffic in Multiprotocol Label Switching (MPLS) packets having labels identifying label switched paths (LSPs) within intermediate network 16. PE routers 18 and core routers 20 may be generically referred to as label switch routers (LSRs), i.e., routers configured to perform label switching. PE routers 18 may be intelligent switches, hubs, Broadband Remote Access Servers (B-RASs), Broadband Network Gateways (BNGs) or other network devices that perform routing functions. LDP LSPs carry traffic on the edges of intermediate network 16, while RSVP LSPs are traffic-engineered within the core of intermediate network 16. In the example of FIG. 1, LDP LSP 22A is established between PE router 18A and core router 20A, LDP LSP 22B is established between core router 20A and core router 20B, and LDP LSP 22C is established between core router 20D and PE router 18B. RSVP LSPs 24A and 24B ("RSVP LSPs 24") traverse different paths through the core of intermediate network 16. LDP LSPs 22A-22C may be LDP LSP segments that form portions of an overall LDP LSP 22 between PE routers 18 that tunnels over one or both of RSVP LSPs 24. PE router 18A may be referred to as the "ingress node" of the overall LDP LSP 22, while PE router 18B may be referred to as the "egress node" of LDP LSP 22.

CE router 12A may send more than one type of traffic within the same Quality of Service (QoS) class to CE router 12B. Each type of traffic may be associated with a different type of application. Examples of traffic of different data types include voice applications (VoIP), multimedia streaming, HTTP web traffic, and data files. CE router 12A may transmit data traffic having certain geographic limitations for security reasons, such as traffic limited to traversing only devices or links located within the United States. Data traffic of this type will be referred to as "Data 1." CE router 12A may also transmit other data traffic having no specific geographic limitation requirements. Data traffic conforming to this data type will be referred to as "Data 2."

Although different types of data, the two types of data traffic Data 1 and Data 2 may fall into the same QoS class. This may occur for a number of reasons. For example, the enterprise customer associated with CEs 12 may only have subscribed for a single Quality of Service with respect to its traffic. Alternatively, Data 1 traffic and Data 2 traffic may be specifically designated as corresponding to the same QoS class, such as by way of EXP bits or other indicators. However, the two types of data traffic may nevertheless require different treatment in the core of intermediate network 16.

In accordance with the principles of the invention, core routers 20 dynamically construct forwarding state that allows them to transmit different types of traffic over different paths through intermediate network 16 even thought the traffic may be marked as or otherwise associated with the same QoS class. As described herein, control-plane information may be exchanged designating different data types that are independent of QoS. Core routers 20 may be configured with policies that tell the core routers 20 to select certain types of paths through intermediate network 16 for packets corresponding to certain types of applications, i.e., different data types. As a result, forwarding state is installed to provide for forwarding one type of data traffic on a certain type of LSP, and another type of data traffic on another type of LSP. Subsequent traffic will travel along the appropriate LSP through the core of the network in accordance with the forwarding state based on the destination address of the traffic. In the example of FIG. 1, RSVP LSP 22A is traffic engineered to traverse only links within the United States, and may thus be suitable for Data 1 traffic. In contrast, RSVP LSP 22B traverses links outside of the United States, e.g., core router 20C, and so may be suitable for Data 2 traffic. Although not illustrated, other RSVP LSPs may exist within the core of intermediate network 16, such as RSVP LSPs that have been traffic-engineered to avoid high latency links, e.g. satellite links.

In one embodiment, one or more routers within system 10, such as CE routers 12, PE routers 18 and CR routers 20A and 20B, are configured to associate a different loopback address with each type of data traffic for each egress router. For example, PE router 18B may associate the loopback address 1.1.1.1 with voice traffic and any other traffic that requires a low-latency path through the core of intermediate network 16. PE router 18B may associate the loopback address 2.2.2.2 with types of traffic, such as certain data traffic, that cannot cross the U.S. border and therefore requires a U.S.-only path through the core of intermediate network 16. PE router 18B may associate the loopback address 3.3.3.3 with other types of traffic that do not have any special requirements for treatment in the core of intermediate network 16, such as general data traffic. Egress routers, such as CR 20D in this example, specify the appropriate loopback address when responding to LSP requests and outputting label map messages. The loopback address may, for example, be included within a FEC or tag included within the label map message. In a system employing ordered control LDP, the default FEC label that is advertised is the loopback address of the egress LSR of the LDP LSP, i.e., PE router 18B in the example of FIG. 1. The loopback address is used as the FEC for LDP messages exchanged by the LSRs within intermediate network 16. PE router 18B sends label map messages advertising a label for each type of traffic and using the loopback address associated with each type of traffic as the destination address. Core routers 20 build routing information based on the label map messages.

In this example embodiment, core routers 20 may be configured with policies that tell core routers 20 to select certain types of LSPs through intermediate network 16 installing forwarding state based on the FEC carried by the control plane messages. When a core router such as core router 20D receives the label map messages, core router 20D sends label map messages advertising different labels for each type of traffic.

Core routers on the ingress of an RSVP LSP, e.g., core router 20A, install forwarding state based on the routing information and the policies. As a result of PE router 18B sending a separate label map message for each type of data traffic, core router 20A is able to install different next hops for the different types of data traffic. Core router 20A uses the policies to determine subsets of routing information to install as forwarding information. For example, when the policies tell core router 20D to install the next hop along an RSVP LSP having a name that begins with the text "U.S.-only" for FEC 2.2.2.2. Core router 20D will then select an appropriate next hop to install in the forwarding information for the label that was advertised for FEC 2.2.2.2. In another example embodiment, the policies may tell core routers 20 to select certain types of paths based on the subnet of the FEC carried by the packet. This approach may be more scalable than configuring policies in terms of each particular FEC address. In some cases, only core routers on the egress of an RSVP LSP, e.g., core router 20D, need to be configured as described herein. Thus, core router 20A installs forwarding state that maps traffic of different types but possibly carrying the same QoS indicator to different next hops based on the destination address, i.e., depending on the type of traffic. The process of label mapping and installing forwarding next hops is described in further detail below with respect to FIG. 2.

In another example embodiment, instead of associating a different loopback address with each type of data traffic requiring different treatment in the core of intermediate network 16, PE routers 18 may apply a tag to the FEC that indicates the type of data traffic. The policies would then be configured on core routers 20 in terms of the tag values. In yet another example embodiment, where LSPs 22 are Border Gateway Protocol (BGP) LSPs set up using BGP, PE routers may indicate the type of service of the packet using the community value associated with BGP packets. In this case, the policies would be configured on core routers 20 to associate different types of RSVP LSPs with the different BGP community values. The network architecture system 10 of FIG. 1 is shown for exemplary purposes only, and other network devices may be present within system 10.

Figure 2:
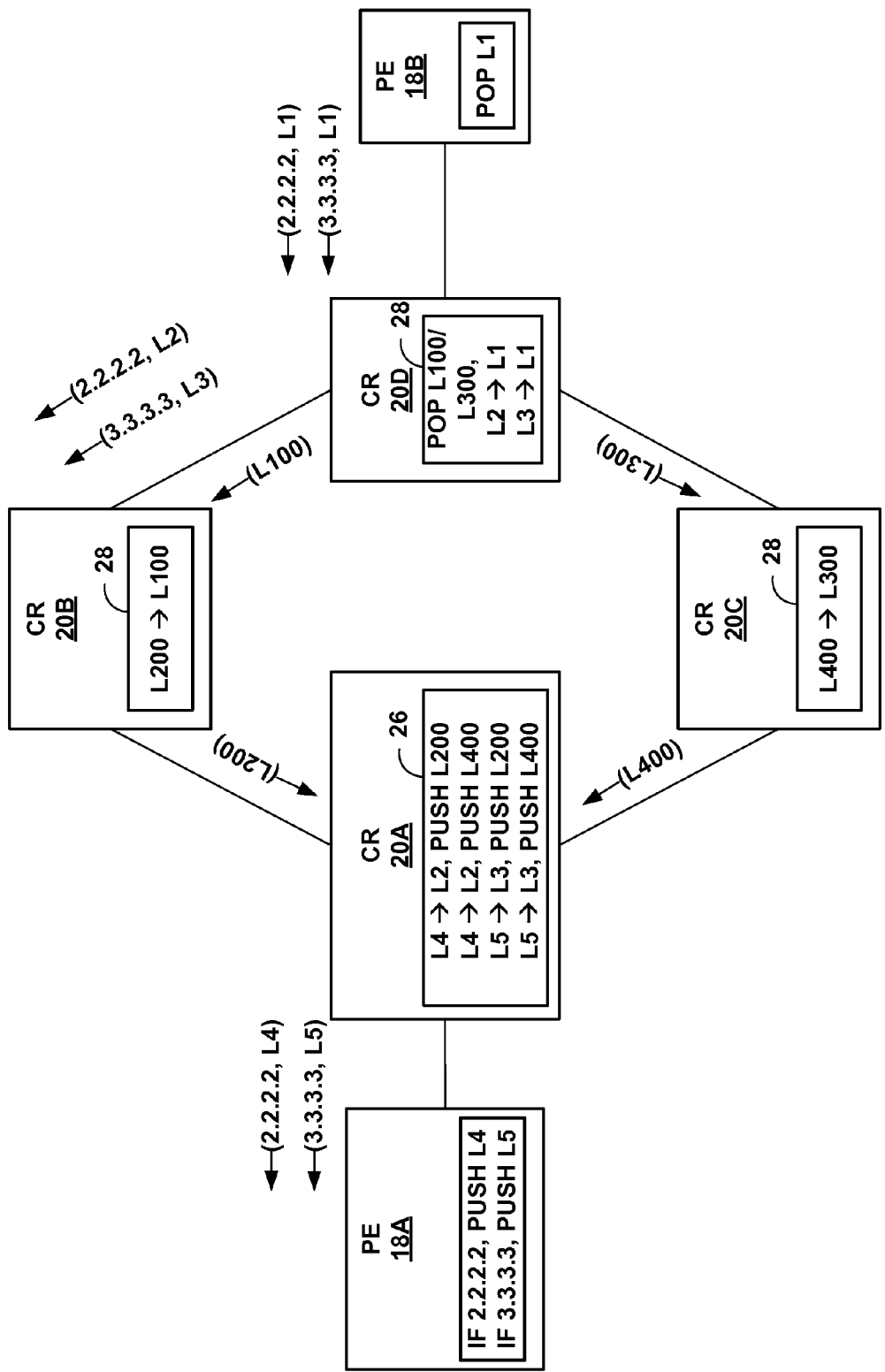
FIG. 2 is a block diagram illustrating label map messages and reservation messages sent between the network devices of the system of FIG. 1, and label mappings maintained by the network devices for forwarding traffic associated with different types of data traffic over different paths through a network.

FIG. 2 is a block diagram illustrating label map messages advertised between the network devices of the system of FIG. 1, and label mappings maintained by the network devices for forwarding traffic associated with different types of data traffic over different paths through a network. In the example of FIGS. 1 and 2, label map messages setting up the LDP LSPs are propagated from right to left, and data traffic is sent along the LDP LSPs and RSVP LSPs from left to right. From the point of view of LDP running on the edges of intermediate network 16, core routers 20A and 20D view the RSVP LSPs within the core as a single hop, even though a plurality of network devices may be present along each of the RSVP LSPs. In response to requests to establish an LSP or in response to configuration by an administrator, PE router 18B sends a label map message for setting up an LSP. For example, PE router 18B may output the label map message in response to a request to set up the LSP received from the ingress router of the desired LSP (i.e., PE router 18A), or in response to configuration by an administrator of intermediate network 16.

RSVP LSPs are established within the core of intermediate network 16 by propagating reservation messages that indicate RSVP labels to be used. Referring to FIGS. 1 and 2, RSVP LSP 24A is established when core router 20D advertises RSVP label L100 to core router 20B by way of a reservation message. Core router 20B receives the reservation message, and in turn advertises RSVP label L200 to core router 20A. Core router 20B stores a label mapping 28 that indicates to swap RSVP label L200 for RSVP label L100 when forwarding traffic along RSVP LSP 24A. Similarly, RSVP LSP 24B is established when core router 20D advertises RSVP label L300 to core router 20C by way of a reservation message. Core router 20C receives the reservation message, and in turn advertises RSVP label L400 to core router 20A. Core router 20C stores a label mapping 28 that indicates to swap RSVP label L400 for RSVP label L300 when forwarding traffic along RSVP LSP 24B. In some embodiments, a full mesh of RSVP LSPs may be established within the core, while in other embodiments, RSVP LSPs may be tactically deployed within the core without forming a full mesh.

In order to configure the LDP LSPs in FIG. 1, PE router 18B is configured to advertise a label map message toward core router 20D for each type of data traffic PE router 18B supports. For example, PE router 18B advertises one LDP label map message for LSPs to service Data 1 traffic, and another LDP label map message for LSPs to service Data 2 traffic. In one embodiment, the label map messages include a FEC and the MPLS label (L1) that should be applied by core router 20D when core router 20D sends LDP traffic associated with the FEC. The label sent by PE router 18B may be the implicit null label, here L1. An LSR that receives a label for a FEC over the best IGP path for the FEC advertises it to its neighbors and installs forwarding state. As shown in FIG. 2, PE router 18B advertises one LDP label map message (2.2.2.2, L1) for Data 1 traffic, and another LDP label map message (3.3.3.3, L1) for Data 2 traffic. Although not illustrated, other information such as the IP address of the customer device to which the traffic is to be delivered may additionally be carried on the label map messages.

Core router 20D receives the label map messages from PE router 18B, chooses MPLS labels to advertise to core router 20A. Core router 20D selects L2 for FEC 2.2.2.2, and L3 for FEC 3.3.3.3, and advertises label map messages (2.2.2.2, L2) and (3.3.3.3, L3) containing the labels to core router 20A. Core routers 20A, 20D see RSVP LSPs 24 as single hops within network 16. The label map messages include the corresponding loopback address that specifies the type of data traffic (e.g., Data 1 traffic or Data 2 traffic) to be forwarded using the labels. Core router 20D installs forwarding state and stores a label mapping 28 indicating that for packets received via one of RSVP LSPs 24 having RSVP label L100 or L300, core router 20D should pop the RSVP label and output the packet towards PE 18B. When the packet further contains an LDP label of L2 or L3, which indicates that an LDP packet was tunneled through one of the RSVP LSPs, core router 20D should swap this for label L1 and output the packet towards PE 18B.

These LDP label map messages are propagated toward the source, i.e., from the right to the left of FIG. 2. Core router 20A receives the LDP label map message from core router 20D, and chooses LDP labels to advertise to its neighboring LSR in the direction of the source device. In particular, core router 20A chooses LDP label L4 to advertise for FEC 2.2.2.2, and LDP label L5 to advertise for FEC 3.3.3.3.

Core router 20A has potential forwarding options 26 based on received label map messages and reservation messages. For purposes of example, four potential forwarding options are shown. Forwarding options 26 include multiple label mappings for each of the LDP labels, one for each possible route through the core (i.e., one for each RSVP LSP through which traffic on the LDP LSP may be tunneled). A first option for a received LDP packet having label L4 indicates that core router 20A should swap LDP label L4 for the LDP label L2, push RSVP label L200 onto the packet to encapsulate the LDP packet and form an RSVP packet, and output the RSVP packet towards core router 20B. A second option for a received LDP packet having label L4 indicates that core router 20A should swap LDP label L4 for the LDP label L2, push RSVP label L400 onto the packet to encapsulate the LDP packet and form an RSVP packet, and output the RSVP packet towards core router 20C. A third option for a received LDP packet having label L5 indicates that core router 20A should swap LDP label L5 for the LDP label L3, push RSVP label L200 onto the packet to encapsulate the LDP packet and form an RSVP packet, and output the RSVP packet towards core router 20B. A fourth option for a received LDP packet having label L5 indicates that core router 20A should swap LDP label L5 for the LDP label L3, push RSVP label L400 onto the packet to encapsulate the LDP packet and form an RSVP packet, and output the RSVP packet towards core router 20C.

In the example of FIG. 2, core router 20A has two options for each LDP label, with each option including a device along a different RSVP LSP that could be installed as the next hop in forwarding information. In fact, core router 20A will install only two of the four potential options shown in FIG. 2, based on the policies. When installing forwarding information, core router 20A applies its configured policies to select the appropriate subset of the routing information to install as forwarding information. In particular, in this example core router 20A will install the first and fourth options shown. In accordance with its policies, core router 20A selects the device along RSVP LSP 24A as the appropriate next hop for Data 1 traffic, and installs core router 20B as the next hop in the forwarding information with instructions to swap L4 for L2 and push L200. Also in accordance with its policies, core router 20A selects the device along RSVP LSP 24B as the appropriate next hop for Data 2 traffic, and installs core router 20C as the next hop in the forwarding information with instructions to swap L5 for L3 and push L400. Core router 20A outputs LDP label map messages (2.2.2.2, L4) and (3.3.3.3, L5) to advertise the LDP labels to PE router 18A.

In this manner, control plane signaling and configured policies are used to establish proper forwarding state so that traffic of different types of data may be forwarded along different physical paths even the though the traffic may be designated to have the same QoS. The installed forwarding state that allows the core routers 20 to map received traffic onto different types of RSVP LSPs within the core of intermediate network 16 based on the type of service of the packets, even where the traffic may fall within the same QoS class and even though the FEC is not carried by the data packet. Accordingly, core router 20A will install forwarding information so as to route Data 1 type traffic onto RSVP LSP 24A where, in this example, it is geographically constrained to remain within the United States borders, and will install forwarding information so as to route Data 2 type traffic onto RSVP LSP 24B, where the traffic may be forwarded by components of the service provider network that span different geographies. The techniques described herein allow traffic having different characteristics to be treated differently within the core based on information within the routing domain, and not based on exclusively on forwarding plane information carried by the packets.

When PE router 18A receives traffic destined for the destination device, PE router 18A will push the appropriate LDP label L4 or L5 onto the packets depending on the destination address of the packets. In particular, if the destination address is 2.2.2.2, PE router 18A will push LDP label L4, while if the destination address is 3.3.3.3, PE router 18A will push LDP label L5. PE router 18A outputs the packets to core router 20A.

Upon receiving the packets, core router 20A will look up the LDP labels in its forwarding information. The forwarding information tells core router 20A that for a received packet having LDP label L4 to swap label L4 for L2, push RSVP label L200, and output the packet to core router 20B on RSVP LSP 24A. The forwarding information also tells core router 20A that for a received packet having LDP label L5 to swap label L5 for L3, push RSVP label L400, and output the packet to core router 20C on RSVP LSP 24B.

In the example where the packet is forwarded onto RSVP LSP 24A, core router 20B receives the packet, swaps RSVP label L200 for RSVP label L100, and forwards the packet to core router 20D. Core router 20D pops RSVP label L100, swaps LDP label L2 for LDP label L1, and forwards the LDP packet to PE router 18B. PE router 18B pops LDP label L1 and forwards the packet to CE router 12B in accordance with its forwarding information. CE router 12B receives the packet, determines a next hop for the packet within customer network 12B, and forwards the packet to the next hop. The packet is ultimately delivered to the destination device within customer network 12B. The process is similar in the example where the packet is forwarded onto RSVP LSP 24B, but in this case core router 20C swaps RSVP label L400 for RSVP label L300 and forwards the packet to core router 20D, which pops RSVP label L300, swaps LDP label L3 for L1, and forwards the packet to PE router 18B.

In the examples described above in which the type of data traffic is identified by a tag associated with the FEC or a BGP community identifier, a similar series of label mappings and forwarding state installations will occur. In these cases, the label mappings may have an additional tag within the FEC or other routing plane identifier that identifies the type of data traffic. The policies will be configured on core routers 20 in terms of the FEC tags or community identifiers, so that the core routers can determine which forwarding state to install for forwarding traffic corresponding to different types of data traffic.

Figure 3:
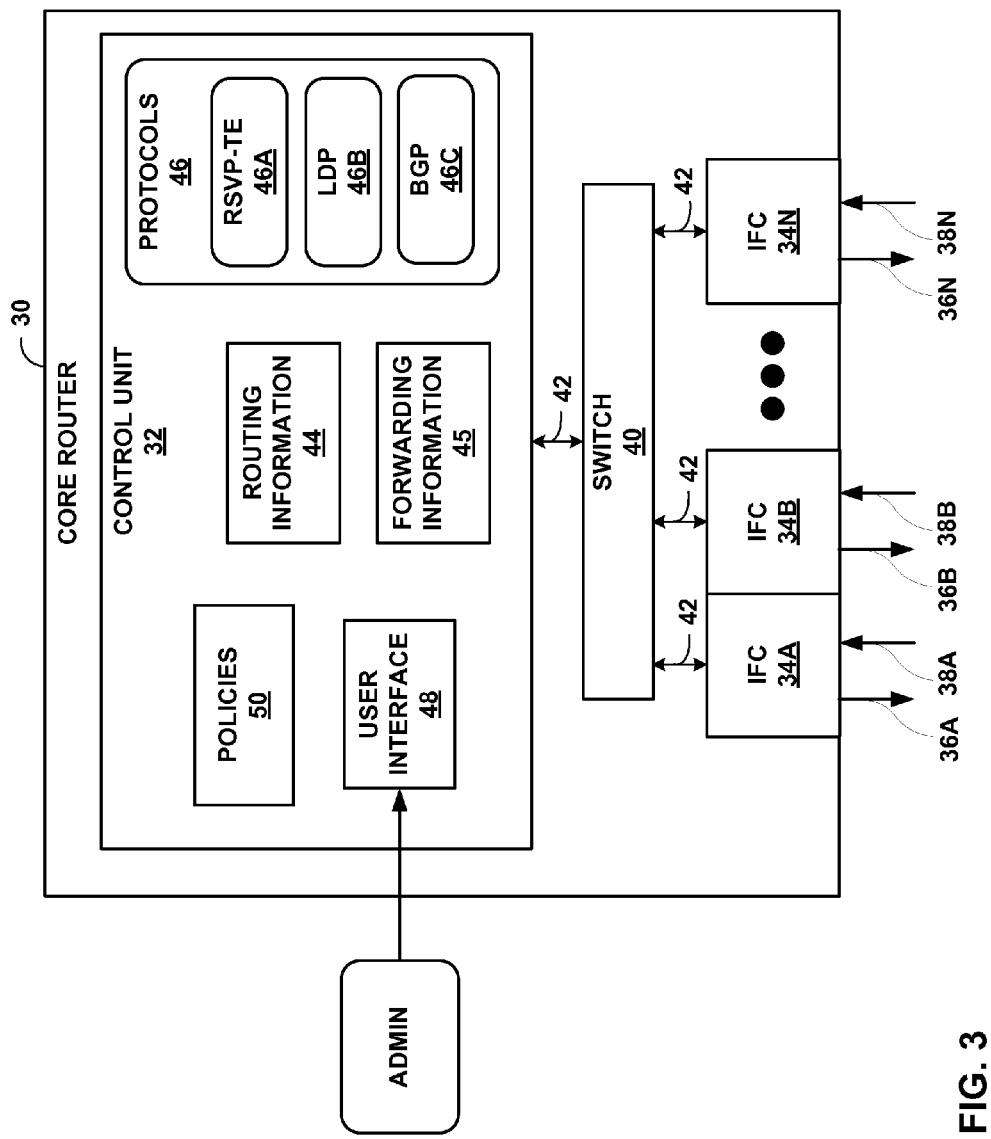
FIG. 3 is a block diagram illustrating, in further detail, an exemplary core router that constructs forwarding state to transmit traffic associated with different types of data traffic over different paths through a network.

FIG. 3 is a block diagram illustrating, in further detail, an exemplary core router 30 that transmits traffic having different characteristics over different paths through intermediate network 16 in accordance with the principles of the invention. Core router 30 may transmit traffic that corresponds to different types of data traffic along different paths through the core of intermediate network 16 even though the traffic may fall within the same QoS class. Core router 30 may, for example, represent any of core routers 20 of FIGS. 1 and 2. Otherwise, core router 30 may represent any transit router within an MPLS LSP across intermediate network 16 or an ingress router of an RSVP LSP deployed within intermediate network 16.

Core router 30 includes a control unit 32 that determines routes of received packets and forwards the packets accordingly. In the exemplary embodiment illustrated in FIG. 3, core router 30 includes interface cards (IFCs) 34A-34N (collectively, "IFCs 34") for communicating packets via inbound links 36A-36N ("inbound links 36") and outbound links 38A-38N ("outbound links 38"). IFCs 34 are interconnected by a high-speed switch 40 and links 42. In one example, switch 40 comprises switch fabric, switchgear, a configurable network switch or hub, and the like. Links 42 comprise any form of communication path, such as electrical paths within an integrated circuit, external data busses, optical links, network connections, wireless connections, or other type of communication path. IFCs 34 are coupled to inbound links 36 and outbound links 38 via a number of interface ports (not shown).

Control unit 32 maintains routing information 44 that describes the topology of intermediate network 16, and in particular, routes through intermediate network 16. Control unit 32 analyzes stored routing information 44 and generates forwarding information 45 for forwarding packets received via inbound links 26 to next hops, i.e., neighboring devices coupled to outbound links 38. Forwarding information 45 may include next hop data indicating appropriate neighboring devices within the network for each of the routes. Core router 30 updates routing information 44 to accurately reflect the topology of the network. Forwarding information 48 and routing information 44 may be maintained in the form of one or more tables, databases, link lists, radix trees, databases, flat files, or any other data structures.

Control unit 32 provides an operating environment for protocols 46, which are typically implemented as executable software instructions. As illustrated, protocols 46 include RSVP-TE 46A, LDP 46B, and BGP 46C. Core router 30 uses protocols 46 to set up LSPs. In accordance with some embodiments, LDP 46B may be programmatically extended include a tag with the LDP FEC that identifies a type of data traffic. Protocols 46 may include other routing protocols in addition to or instead of protocols 46A-46C shown, such as other Multi-protocol Label Switching (MPLS) protocols or routing protocols, interior routing protocols, or other network protocols.

A system administrator may provide configuration information to core router 30 via user interface 48 included within control unit 32. For example, the system administrator may configure core router 30 or install software to extend LDP 46B as described herein. As another example, the system administrator may configure policies 50. Policies 50 include policies that trigger the dynamic building of indexed forwarding state in forwarding information 45 based on a type of data traffic. A policy configured by the system administrator in policies 50 may specify that upon receiving label map messages of a particular type of data traffic, control unit 32 should select a path from a particular subset of routing information 44 (e.g., RSVP LSPs having certain characteristics). Example policies are described in further detail below with respect to FIGS. 4A-4D.

In general, core router 30 determines which subset of routing information 44 to use in building forwarding information 45 by referencing policies 50 and applying the policies. Control unit 32, or a separate forwarding engine, applies policies 50 to received control plane messages and, if necessary, dynamically builds forwarding information based on the type of data traffic with which control plane messages are associated. In this manner, forwarding information 45 is dynamically built so that core router 30, a transit node within an MPLS LSP across network 18, can forward packets on different paths through network 18 based on the type of data traffic of the packets as identified by control-plane information carried by the packets.

In particular, according to one example policy stored within of policies 50, core router 30 uses a first category of routes specified by routing information 44 for building the next hop when type of data traffic of a received packet is "U.S. only," and uses a second category of routes specified by routing information 44 for building the next hop when the type of data traffic of the received packet is "General." Routing information 44 may include lists of RSVP LSPs, where the names of RSVP LSPs indicate the type of RSVP LSP. Core router 30 does a wildcard search of routing information 44 to select an RSVP LSP whose name starts with the desired text. Core router 30 determines the appropriate subset of routing information 44 from which to select a path based on information carried in the control plane of received packets. As examples, core router 30 may determine the subset of routing information 44 based on one of the FEC, FEC subnet, FEC tag, or community identifier of received packets. The label mappings 26 of FIG. 2 may be maintained as part of forwarding information 45.

When core router 30 receives a packet via one of inbound links 36, control unit 32 determines a destination and associated next hop for the packet in accordance with routing information 44 and forwards the packet on one of outbound links 38 to the corresponding next hop in accordance with forwarding information 45 based on the destination of the packet.

Core router 30 may push or swap LDP or RSVP labels onto the packet in accordance with forwarding information 45.

The architecture of core router 30 illustrated in FIG. 3 is shown for exemplary purposes only. The invention is not limited to this architecture. In other embodiments, core router 30 may be configured in a variety of ways. In one embodiment, for example, control unit 32 and its corresponding functionality may be distributed within IFCs 34. In another embodiment, control unit 32 may include a routing engine that performs routing functions and maintains a routing information base (RIB), e.g., routing information 44, and a forwarding engine that performs packet forwarding based on a forwarding information base (FIB), e.g., forwarding information 45, generated in accordance with the RIB. Moreover, although described with respect to core router 30, the forwarding techniques described herein may be applied to other types of network devices, such as gateways, switches, servers, workstations, or other network devices.

Control unit 32 may be implemented solely in software, or hardware, or may be implemented as a combination of software, hardware, or firmware. For example, control unit 32 may include one or more processors that execute software instructions. In that case, the various software modules of control unit 32, such as protocols 46, may comprise executable instructions stored on a computer-readable medium, such as computer memory or hard disk.

FIGS. 4A-4D are block diagrams illustrating example policy data structures that may be maintained by core router 30 of FIG. 3. FIG. 4A is a block diagram illustrating an example policy data structure 51 that may be maintained by core router 30 in accordance with one embodiment of the invention. Policy data structure 51 includes a list of policies 1-N that are written in terms of particular FEC values (i.e., particular loopback addresses of PE routers). Policy 1 instructs control unit 32 that when the FEC carried by a received packet is 1.1.1.1, control unit 32 should select an RSVP LSP having a name that starts with the text "low-latency" for building the next hop. Policy 2 instructs control unit 32 that when the FEC carried by a received packet is 2.2.2.2, control unit 32 should select an RSVP LSP having a name that starts with the text "U.S.-only" for building the next hop. Policy 3 instructs control unit 32 that when the FEC carried by a received packet is 3.3.3.3, control unit 32 should select an RSVP LSP having a name that starts with the text "general" for building the next hop. In this manner, core router 30 can apply the policies when determining a next hop to install within forwarding information 45.

FIG. 4B is a block diagram illustrating an example policy data structure 52 that may be maintained by core router 30 in accordance with another embodiment of the invention. Policy data structure 52 includes a list of policies 1-N that are written in terms of FEC value subnets. Policy 1 instructs control unit 32 that when the FEC carried by a received packet is within the subnet 1.0.0.0/8, control unit 32 should select an RSVP LSP having a name that starts with the text "low-latency" for building the next hop. Policy 2 instructs control unit 32 that when the FEC carried by a received packet is within the subnet 2.0.0.0/8, control unit 32 should select an RSVP LSP having a name that starts with the text "U.S.-only" for building the next hop. Policy 3 instructs control unit 32 that when the FEC carried by a received packet is within the subnet 3.0.0.0/8, control unit 32 should select an RSVP LSP having a name that starts with the text "general" for building the next hop. In this manner, core router 30 can apply the policies when determining a next hop to install within forwarding information 45.

FIG. 4C is a block diagram illustrating an example policy data structure 54 that may be maintained by core router 30 in accordance with yet another embodiment of the invention. Policy data structure 54 includes a list of policies 1-N that are written in terms of values of tags carried with a FEC. Policy 1 instructs control unit 32 that when the FEC carried by a received packet has a tag corresponding to "voice," control unit 32 should select an RSVP LSP having a name that starts with the text "low-latency" for building the next hop. Policy 2 instructs control unit 32 that when the FEC carried by a received packet has a tag corresponding to "U.S.-only," control unit 32 should select an RSVP LSP having a name that starts with the text "U.S.-only" for building the next hop. Policy 3 instructs control unit 32 that when the FEC carried by a received packet has a tag corresponding to "general," control unit 32 should select an RSVP LSP having a name that starts with the text "general" for building the next hop. In this manner, core router 30 can apply the policies when determining a next hop to which to install within forwarding information 45.

FIG. 4D is a block diagram illustrating an example policy data structure 56 that may be maintained by core router 30 in accordance with another embodiment of the invention. Policy data structure 56 includes a list of policies 1-N that are written in terms of a community identifier carried with a FEC. Policy 1 instructs control unit 32 that when the FEC carried by a received packet has community identifier corresponding to "voice," control unit 32 should select an RSVP LSP having a name that starts with the text "low-latency" for building the next hop. Policy 2 instructs control unit 32 that when the FEC carried by a received packet has a community identifier corresponding to "U.S.-only," control unit 32 should select an RSVP LSP having a name that starts with the text "U.S.-only" for building the next hop.

Policy 3 instructs control unit 32 that when the FEC carried by a received packet has a community identifier corresponding to "general," control unit 32 should select an RSVP LSP having a name that starts with the text "general" for building the next hop. In this manner, core router 30 can apply the policies when determining a next hop to install within forwarding information 45. Although policy data structures 51, 52, 54, and 56 are described in terms of separate example policy data structures, policy data structure 50 of core router 30 of FIG. 3 may contain policies written in terms of some or all of the policies described with reference to FIGS. 4A-4D. Policies may be installed to policy data structures 51, 52, 54, or 56 by an administrator of intermediate network 16 or by way of an automated software agent.

Figure 5:
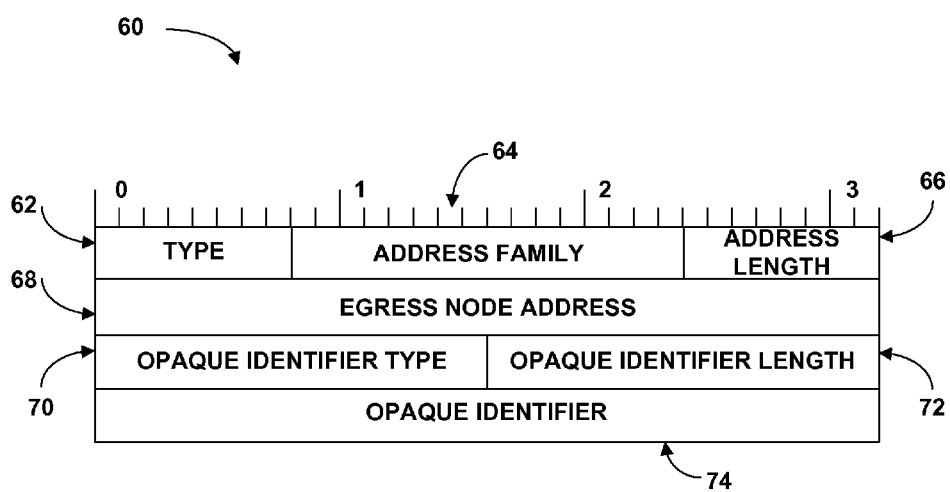
FIG. 5 is a block diagram illustrating an exemplary new label distribution protocol forwarding equivalence class (FEC) element for use in selecting a next hop according to a type of data traffic of a packet.

FIG. 5 is a block diagram illustrating an exemplary new label distribution protocol forwarding equivalence class (FEC) element, referred to herein as a data-specific FEC element, for use in selecting a next hop according to a type of data traffic associated with a packet. Data-specific FEC element 60 consists of the address of the egress node of the LDP LSP and an opaque identifier. The opaque identifier acts as a tag that identifies the type of data conveyed by the packet, such as voice data, multimedia data, file transfer data, web data, U.S.-only data, or general data.

Data-specific FEC element 60 may be encoded as illustrated in FIG. 5. The type 62 of Data-specific FEC element 60 is to be assigned by the Internet Assigned Numbers Authority (IANA). Address family 64 is a two octet quantity containing a value that encodes the address family for the egress LSR address. Address length 66 is the length of the egress LSR address in octets. Egress node address 68 is a host address encoded according to the address family field 64. Opaque identifier type 70 is the type of opaque identifier. Opaque identifier length 72 is the length of the opaque identifier in octets. Opaque identifier 74 is an opaque identifier of a length in octets as defined by opaque identifier length 72 and padded with zeros so as to be 4-octet aligned.

If address family 64 is Internet Protocol Version Four (IPv4), address length 66 comprises 4. If address family 64 is IPv6, address length 66 comprises 16. Other address lengths may be defined. If address length 66 does not match the defined length for address family 64, the receiving router may abort processing the message containing the FEC element, and send an "Unknown FEC" notification message to the LDP peer signaling an error. If a FEC type-length-value (TLV) contains a data-specific FEC element, the data-specific FEC element may be the only FEC element in the FEC TLV. The encoding scheme for data-specific FEC element as illustrated in FIG. 5 is merely exemplary. Other encoding schemes may be used for encoding the data-specific FEC element 60.

Figure 6:
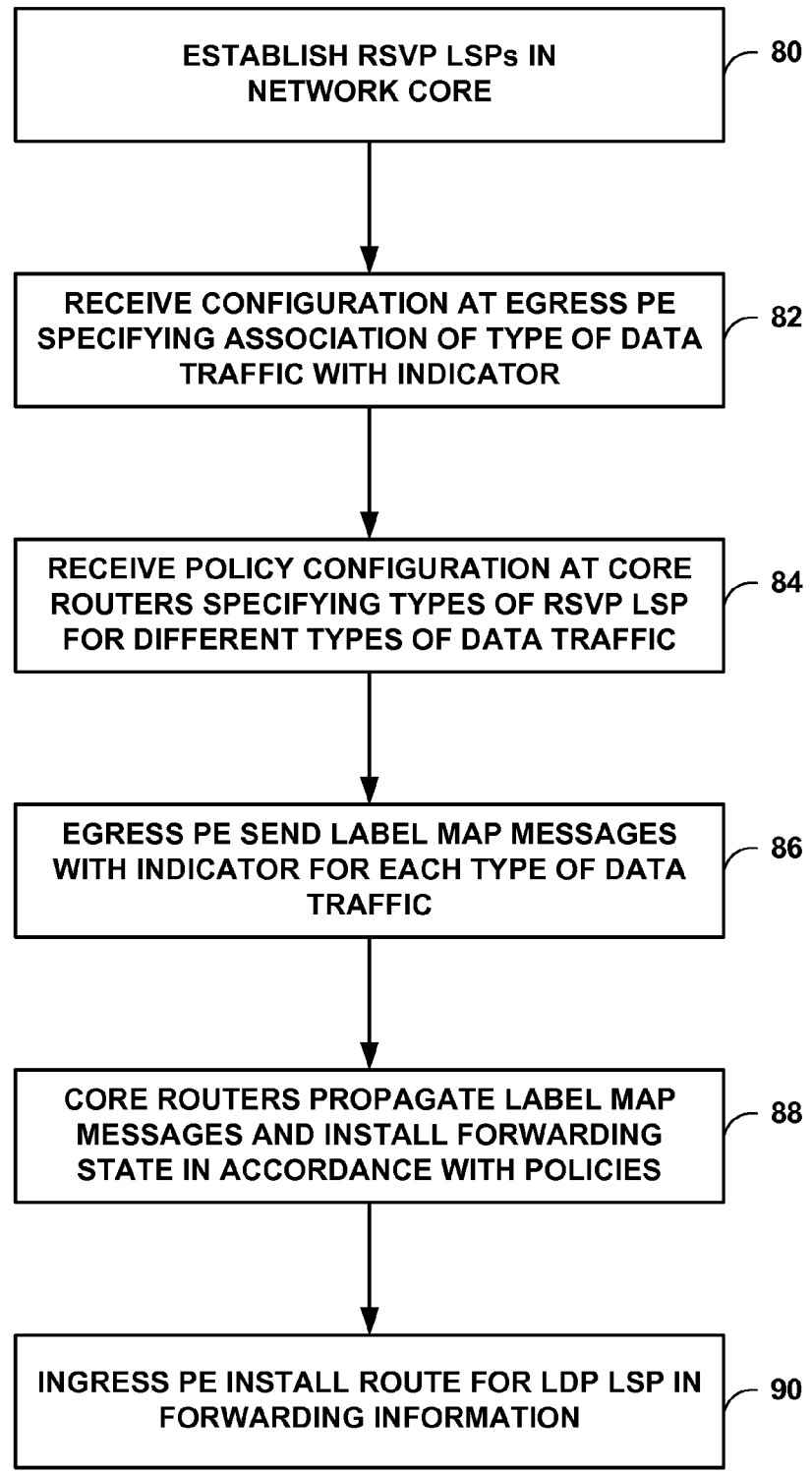
FIG. 6 is a flowchart illustrating example operation of the core router of FIG. 3 in installing forwarding information for use in forwarding traffic associated with different types of data traffic over different paths through the network.

FIG. 6 is a flowchart illustrating example operation of core router 30 of FIG. 3 in installing forwarding information for use in forwarding traffic associated with different types of data traffic over different physical paths through intermediate network 16. RSVP LSPs are traffic-engineered within the core of intermediate network 16 (80). In some embodiments, a full mesh of RSVP LSPs may be established within the core, while in other embodiments, RSVP LSPs may be tactically deployed within the core without forming a full mesh. PE router 18B on the egress of LDP LSP segment 22B receives configuration specifying an association between a type of data traffic and a particular indicator (82). PE router 18B is configured to associate a different indicator with each type of data traffic. In one embodiment, PE router 18B receives configuration of different loopback addresses to advertise for different types of data traffic (e.g., 1.1.1.1 for voice, 2.2.2.2 for U.S. only data, 3.3.3.3 for general data). In another embodiment, the label distribution protocol executing on PE router 18B is extended to use the data-specific FEC element of FIG. 5, and PE router 18B is configured to use a certain opaque identifier for each type of data traffic. Thus, the FEC element essentially carries a tag that identifies the type of service of the packet. In a further embodiment, PE router 18B is configured to associate different BGP communities with different types of data traffic. The configuration may be performed by an administrator of intermediate network 16 or by way of an automated software agent.

Core routers 20 receive configuration of policies that specify types of RSVP LSPs that correspond to each type of data traffic (84), as described above with respect to FIGS. 4A-4D. The configured policies match to RSVP LSPs based on the kind of indicator configured, e.g. FEC address, FEC subnet, FEC tag, or BGP community. Other indicators that may be carried within the control plane may be used, and the invention is not limited to the examples specified herein. In some embodiments, only core routers 20 at the ingress of the LDP LSP 22 (i.e., core router 20A) need be configured with the policies, while in other embodiments all core routers 20 need to be configured with the policies. Policies may be installed to policy data structure 50 by an administrator of intermediate network 16 or by way of an automated software agent.

As discussed above, PE router 18B at the egress of LDP LSP 22 sends an LDP label map message for each type of data traffic to be forwarded to the customer network coupled to PE router 18B (86). Core routers 20 propagate the label map messages and install forwarding state in accordance with the configured policies (88). For example, core router 20A installs a next hop of core router 20B for packets received carrying LDP label L4 to tunnel Data 1 traffic into RSVP LSP 24A, and installs a next hop of core router 20C for packets received carrying LDP label L5 to tunnel Data 2 traffic into RSVP LSP 24B. The ingress PE router of the LDP LSP 22 (i.e., PE router 18A) also installs routes for LDP LSP 22 in its forwarding information (90). When PE router 18A subsequently receives traffic to be sent on LDP LSP 22, PE router 18A attaches the appropriate LDP labels depending on the destination address of the traffic in accordance with the forwarding information. Due to manner in which the forwarding information has been installed, the traffic may receive different treatment in the core of intermediate network 16 depending on its type of service.

Various embodiments of the invention have been described. These and other embodiments are within the scope of the following claims.

The invention claimed is:

1. A method comprising:

with a provider edge (PE) router of a network, sending a first control plane message to a core router of the network for constructing a first label switched path (LSP) to the PE router, wherein the first LSP conforms to a first type of LSP, wherein the PE router is an egress node of the first LSP, and wherein the control plane message includes a label (L1) for the first LSP and a first loopback address of the PE router associated with a first type of data traffic for constructing the first LSP to carry the first type of data traffic;

with the PE router, sending a second control plane message to the core router for constructing a second LSP within the network to the PE router, wherein the second LSP conforms to the first type of LSP, wherein the PE router is the egress node of the second LSP, and wherein the second control plane message includes a label (L2) for the second LSP and a second loopback address of the PE router associated with a second type of data traffic for constructing the second LSP to carry the second type of data traffic;

receiving packets from the core router carrying the first type of data traffic over the first LSP, wherein the packets carrying the first type of data traffic identify the first loopback address of the PE router as a destination address of the packets; and receiving packets from the core router carrying the second type of data traffic over the second LSP, wherein the packets carrying the second type of data traffic identify the second loopback address of the PE router as a destination address of the packets.

2. The method of claim 1, wherein the first loopback address is included in a forwarding equivalence class (FEC) field of the first control plane message, and wherein the second loopback address is included in a FEC field of the second control plane message.

3. The method of claim 1, wherein the first loopback address is included in a tag applied to the forwarding equivalence class (FEC) of the first control plane message, and wherein the second loopback address is included in a tag applied to the FEC of the second control plane message.

4. The method of claim 1, wherein the first type of LSP comprises a Border Gateway Protocol (BGP) LSP, wherein the control plane messages conform to BGP, wherein the first control plane message includes a first community identifier that indicates the first type of data traffic, and wherein the second control plane message includes a second community identifier that indicates the second type of data traffic.

5. The method of claim 1, wherein the first type of LSP comprises an LDP LSP, wherein the control plane messages conform to the Label Distribution Protocol (LDP).

6. The method of claim 1, wherein the label (L1) for the first LSP and the label (L2) for the second LSP comprise the same label.

7. The method of claim 1, wherein the label (L1) for the first LSP and the label (L2) for the second LSP comprise different labels.

8. A provider edge (PE) router comprising:
a control unit that sends a first control plane message to a core router of a network for constructing a first label switched path (LSP) to the PE router, wherein the first LSP conforms to a first type of LSP, wherein the PE router is an egress node of the first LSP, and wherein the control plane message includes a label (L1) for the first LSP and a first loopback address of the PE router associated with a first type of data traffic for constructing the first LSP to carry the first type of data traffic,
wherein the control unit sends a second control plane message to the core router for constructing a second LSP within the network to the PE router, wherein the second LSP conforms to the first type of LSP, wherein the PE router is the egress node of the first LSP, and wherein the second control plane message includes a label (L2) for the second LSP and a second loopback address of the PE router associated with a second type of data traffic for constructing the second LSP to carry the second type of data traffic; and
a physical interface that receives packets from the core router carrying the first type of data traffic over the first LSP, wherein the packets carrying the first type of data traffic identify the first loopback address of the PE router as a destination address of the packets, and
wherein the physical interface receives packets from the core router carrying the second type of data traffic over the second LSP, wherein the packets carrying the second type of data traffic identify the second loopback address of the PE router as a destination address of the packets.

9. The router of claim 8, wherein the first loopback address is included in a forwarding equivalence class (FEC) field of the first control plane message, and wherein the second loopback address is included in a FEC field of the second control plane message.

10. The router of claim 8, wherein the first loopback address is included in a tag applied to the forwarding equivalence class (FEC) of the first control plane message, and wherein the second loopback address is included in a tag applied to the FEC of the second control plane message.

11. The router of claim 8, wherein the first type of LSP comprises a Border Gateway Protocol (BGP) LSP, wherein the control plane messages conform to BGP, wherein the first control plane message includes a first community identifier that indicates the first type of data traffic, and wherein the second control plane message includes a second community identifier that indicates the second type of data traffic.

12. The router of claim 8, wherein the first type of LSP comprises an LDP LSP, wherein the control plane messages conform to the Label Distribution Protocol (LDP).

13. The router of claim 8, wherein the label (L1) for the first LSP and the label (L2) for the second LSP comprise the same label.

14. The router of claim 8, wherein the label (L1) for the first LSP and the label (L2) for the second LSP comprise different labels.

15. A non-transitory computer-readable medium comprising instructions for causing a programmable processor to forward network traffic in a network, the instructions causing the programmable processor to:
send a first control plane message to a core router of the network for constructing a first label switched path (LSP) to the PE router, wherein the first LSP conforms to a first type of LSP, wherein the PE router is an egress node of the first LSP, and wherein the control plane message includes a label (L1) for the first LSP and a first loopback address of the PE router associated with a first type of data traffic for constructing the first LSP to carry the first type of data traffic;
send a second control plane message to the core router for constructing a second LSP within the network to the PE router, wherein the second LSP conforms to the first type of LSP, wherein the PE router is the egress node of the first LSP, and wherein the second control plane message includes a label (L2) for the second LSP and a second loopback address of the PE router associated with a second type of data traffic for constructing the second LSP to carry the second type of data traffic;
receive packets from the core router carrying the first type of data traffic over the first LSP, wherein the packets carrying the first type of data traffic identify the first loopback address of the PE router as a destination address of the packets; and
receive packets from the core router carrying the second type of data traffic over the second LSP, wherein the packets carrying the second type of data traffic identify the second loopback address of the PE router as a destination address of the packets.

16. The non-transitory computer-readable medium of claim 15, wherein the first loopback address is included in a forwarding equivalence class (FEC) field of the first control plane message, and wherein the second loopback address is included in a FEC field of the second control plane message.

17. The non-transitory computer-readable medium of claim 15, wherein the first loopback address is included in a tag applied to the forwarding equivalence class (FEC) of the first control plane message, and wherein the second loopback address is included in a tag applied to the FEC of the second control plane message.

18. The non-transitory computer-readable medium of claim 15, wherein the first type of LSP comprises a Border Gateway Protocol (BGP) LSP, wherein the control plane messages conform to BGP, wherein the first control plane message includes a first community identifier that indicates the first type of data traffic, and wherein the second control plane message includes a second community identifier that indicates the second type of data traffic.

19. The non-transitory computer-readable medium of claim 15, wherein the first type of LSP comprises an LDP LSP, wherein the control plane messages conform to the Label Distribution Protocol (LDP).

20. The non-transitory computer-readable medium of claim 15, wherein the label (L1) for the first LSP and the label (L2) for the second LSP comprise the same label.

* * * * *